Patented July 22, 1930

1,771,044

UNITED STATES PATENT OFFICE

ALAN C. JOHNSTON, OF KENVIL, NEW JERSEY, ASSIGNOR TO HERCULES POWDER COMPANY, OF WILMINGTON, DELAWARE, A CORPORATION OF DELAWARE

METHOD OF PRODUCING RESIN ESTERS

No Drawing. Application filed June 29, 1928, Serial No. 289,332. Renewed August 23, 1929.

My invention relates to an improved method of producing resin esters, such for example, as the esters of abietic acid, pimaric acid, etc. and my invention relates to the production of resin esters by the treatment of a resin acid, the ester of which is desired, or by the treatment of a resin in which such acid is found.

Resin esters to the production of which my invention relates vary substantially in their characteristics, some being, for example, viscous liquids, while others are hard, tough solids, and they find their principal use in varnishes and lacquers in which they may be used instead of ordinary ester gum.

The method in accordance with my invention involves, generally speaking, the treating of a resin acid, as for example, abietic acid, pimaric acid, etc., or a resin, as for example, wood or gum rosin, copal, etc., with a dichlorohydrin, or a dibromohydrin, in the presence of an alkali.

More specifically, in carrying out the method in accordance with my invention, the treatment is preferably by heating the resin or resin acid and the alkali which, for example, may be sodium hydroxide, sodium carbonate, potassium hydroxide and the like, in solution, for example, in alcohol, or water. The treatment may be effected by heating under pressure or by refluxing.

In accordance with my invention, I may use glycerol dichlorohydrin or glycerol dibromohydrin, or mixtures thereof.

As an illustration of the application of the method embodying my invention to the production of, for example, the ester glycerol diabietate, say 75 parts of gum rosin, grade WW is dissolved in a solution comprising 100 parts of alcohol containing 10 parts of sodium hydroxide. The solution is then refluxed at a temperature of say 80° C. and about 25 parts of glycerol dichlorohydrin, boiling point 174° C. at 760 mm. mercury, are added gradually to the refluxing solution. During the treatment sodium chloride, or common salt, will be formed and will separate out rapidly. The refluxing is continued for a period of about fifteen hours, or until the desired ester is formed, after which the salt is filtered out and the alcohol and excess glycerol dichlorohydrin distilled off, leaving about 70 parts glycerol diabietate, acid No. 1, melting point 74° C. by the drop method.

In the treatment as described above sodium resinate is formed which through reaction with the dichlorohydrin results in the formation of sodium chloride and the desired ester. The reaction between the sodium resinate and the dichlorohydrin may be illustrated as follows:

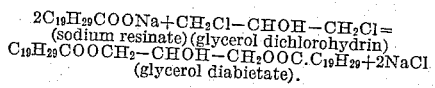

$2C_{19}H_{29}COONa + CH_2Cl-CHOH-CH_2Cl =$
(sodium resinate) (glycerol dichlorohydrin)
$C_{19}H_{29}COOCH_2-CHOH-CH_2OOC.C_{19}H_{29} + 2NaCl$
(glycerol diabietate).

In the carrying out of the method as illustrated by the above examples, the reaction period may be decreased by heating at a temperature, for example, up to about 150° C. under a pressure within, for example, the range atmospheric to about 150 pounds per square inch. It will be understood that while in the above examples the reaction is described as carried out in alcoholic solution, the reaction may be carried out in aqueous solution, though better results and higher yields will be obtained in alcoholic solution.

As has been indicated, various resin acids, as abietic, pimaric, etc., and resins, as wood and gum rosin, fossil resins, etc. may be used in the production of esters in accordance with my invention and various alkalis may be used and the method may be carried out with aqueous solutions as well as with solutions formed by the use of alcohol, and it will be understood that where in the claims appended hereto reference is made to glycerol dichlorohydrin, I contemplate the use of glycerol dibromohydrin as an equivalent.

Having now fully described my invention, what I claim and desire to protect by Letters Patent is:

1. The method of producing a resin acid ester which includes heating a resin acid with glycerol dichlorohydrin in the presence of an alkali.

2. The method of producing a resin acid ester which includes heating abietic acid with glycerol dichlorohydrin in the presence of an alkali.

3. The method of producing a resin acid ester which includes heating rosin with glycerol dichlorohydrin in the presence of an alkali in solution.

4. The method of producing a resin acid ester which includes heating rosin with glycerol dichlorohydrin in the presence of an alkali in solution in alcohol.

5. The method of producing a resin acid ester which includes heating rosin with glyceral dichlorohydrin in the presence of an alkali.

6. The method of producing a resin acid ester which includes heating an alkali metal abietate with glycerol dichlorohydrin.

7. The method of producing a resin acid ester which includes heating an alkali metal resinate with glycerol dichlorohydrin.

8. The method of producing a resin acid ester which includes heating sodium resinate with glycerol dichlorohydrin.

9. The method of producing a resin acid ester which includes heating sodium abietate with glycerol dichlorohydrin.

10. The method of producing a resin acid ester which includes heating a resin acid with glycerol dichlorohydrin in the presence of an alkali in solution.

11. The method of producing a resin acid ester which includes heating an alkali metal abietate with glycerol dichlorohydrin in solution.

12. The method of producing a resin acid ester which includes heating an alkali metal resinate with glycerol dichlorohydrin in solution.

13. The method of producing a resin acid ester which includes heating sodium abietate with glycerol dichlorohydrin in solution.

14. The method of producing a resin acid ester which includes heating a resin acid with glycerol dichlorohydrin in the presence of an alkali in solution in alcohol.

15. The method of producing a resin acid ester which includes heating an alkali metal abietate with glycerol dichlorohydrin in solution in alcohol.

16. The method of producing a resin acid ester which includes heating sodium resinate with glycerol dichlorohydrin in solution.

In testimony of which invention, I have hereunto set my hand, at Kenvil, N. J., on this 26th day of June, 1928.

ALAN C. JOHNSTON.